July 17, 1951 J. F. NEVILLE 2,560,885
PRY TOOL FOR REMOVING TIRE CASINGS FROM RIMS
Filed Sept. 8, 1948
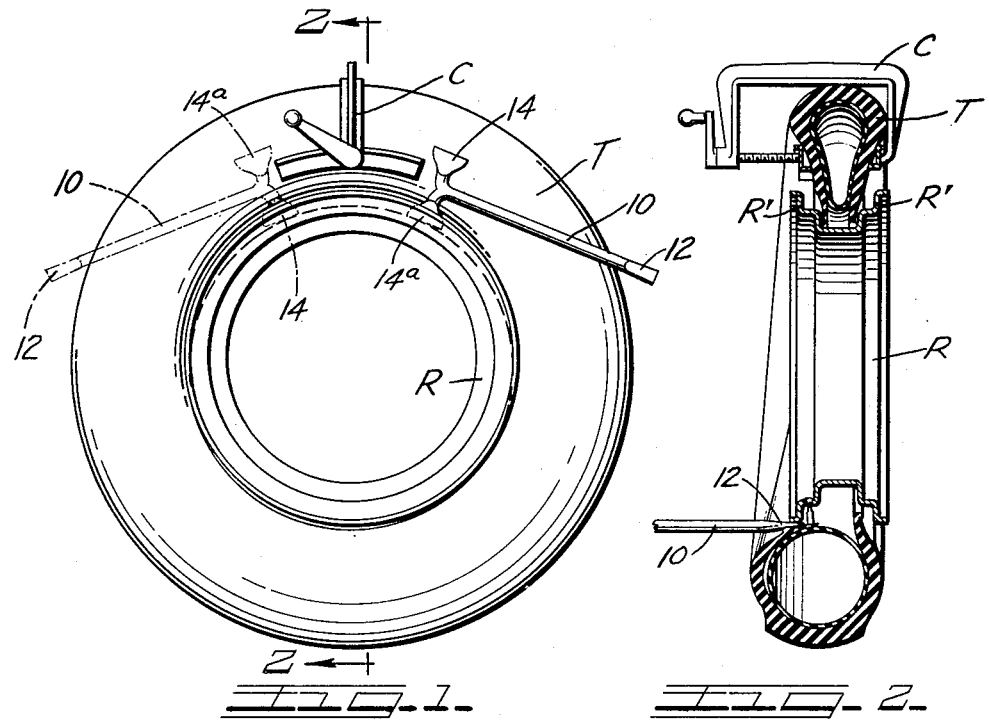
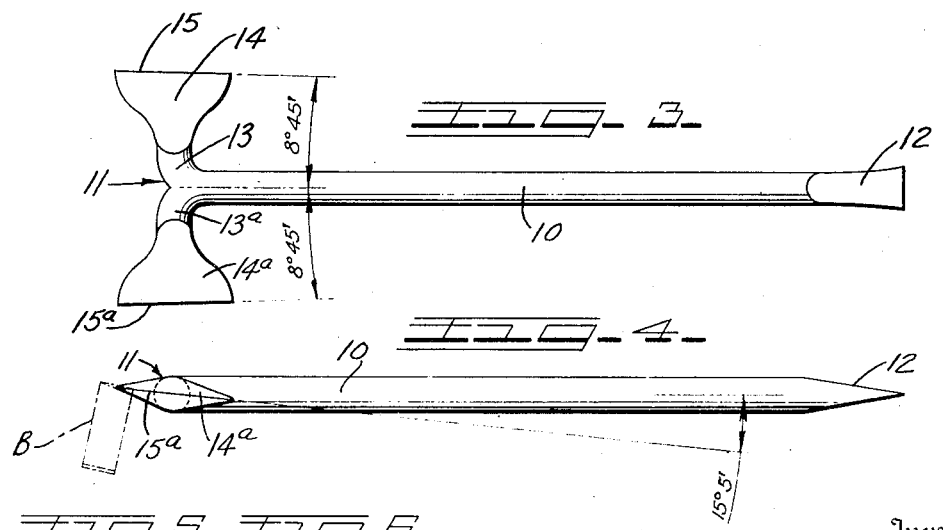
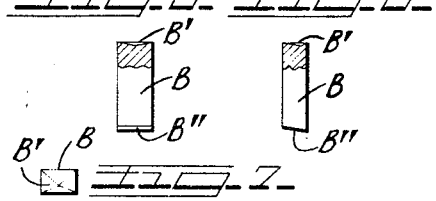
Inventor
Joseph F. Neville
By H. R. Willson & Co.
Attorneys Patented July 17, 1951

2,560,885

UNITED STATES PATENT OFFICE 2,560,885

PRY TOOL FOR REMOVING TIRE CASINGS FROM RIMS

Joseph F. Neville, Woodruff, Utah

Application September 8, 1948, Serial No. 48,170

1 Claim. (Cl. 157—1.3)

The invention relates to an auxiliary pry tool for the purpose of prying tire casings from the outer portion of the wheel rims to the drop-centers thereof to facilitate removing the casing from the rim.

In the present common procedure of removing tire casings from a conventional drop-center type rim, and also removing heavy truck or tractor tires, a tire clamp is employed to "pinch" the casing or press its side walls together to move the beads of the casing toward the rim's drop-center at the point where the clamp is used. An auxiliary pry tool is then inserted between the side wall or flange of the rim and the casing bead, to pry the casing bead inwardly to a point where it will fall into the drop-center portion of the rim.

One object of the invention is to provide an auxiliary tire tool having a double-bladed, hatchet-shaped head with its two blades set at the proper angles for insertion between the casing and the rim to pry the casing inwardly on opposite sides of the tire clamp and on both sides of the casing.

Another object of the invention is to provide a block between the hatchet-type blade and the casing in cases where tires are to be removed from extremely wide rims and where the width of the hatchet-type blade is insufficient to breach the distance between the side wall or flange of the rim and the drop-center of the rim.

Other objects and advantages of the invention will become apparent from the following description and the accompanying drawing in which:

Figure 1 is a side elevation of a tire casing and rim showing the tire tool in two operative positions in full and broken lines.

Figure 2 is a vertical section taken on line 2—2 of Figure 1 but showing, in the upper portion, the tire bead in the drop-center portion of the rim, and showing, in the lower portion, the casing being removed from the rim.

Figure 3 is a side view of the tire tool.

Figure 4 is an edge view of the tire tool and showing the position of the block in relation to the tool in broken lines.

Figure 5 is a top view of the block used with the tire tool on relatively wide rims, showing a part broken away and in section.

Figure 6 is an edge view of the block showing a part broken away and in section.

Figure 7 is an end view of the block.

A preferred construction has been illustrated and will be specifically described, but attention is invited to the possibility of making minor variations within the scope of the invention as claimed.

In the drawing R represents a conventional form of drop-center rim with side walls or flanges R', T represents a tire casing and C a conventional form of tire clamp.

The double-pry tire tool is preferably constructed of a good grade of pinch-bar steel and its length may vary according to the type of tire on which it is to be used. The straight shaft or handle portion 10 is preferably from about 16 to 35 inches long and from 5/8 to 3/4 inches in diameter. It may be any reasonable size and have any cross-sectional shape, instead of the cylindrical shape illustrated.

The outer or front end of the handle portion 10 is provided with a double-bladed, hatchet-shaped head generally indicated by the numeral 11, while the inner or rear end of the handle is provided with a chisel-shaped extremity 12 for the purpose of prying the casing from the rim as shown in Figure 2.

The substantially T-shaped head 11 is integrally formed with the handle or shank 10 and includes two diametrically opposed neck or shank portions 13, 13a carrying wide hatchet-shaped blades 14, 14a with straight outer edges 15, 15a. The opposite side faces of the generally triangular-shaped blades 14, 14a are flat and converge outwardly to the edges 15, 15a so the blades are V-shaped in cross-section to facilitate their insertion between the casing bead and the adjacent flange or side wall of a rim. The edges 15, 15a are about 2 inches long and they are about 4 inches apart, so that when one blade is inserted between the rim flange and the casing bead the other blade will engage the casing above the bead. The straight edges 15, 15a which extend in the direction of the length of the handle, preferably converge in a rearward direction being disposed at an angle of 8° 45' with respect to the longitudinal axis of the straight handle 10 as indicated by the arrows in Figure 3. The blades 14, 14a have their central longitudinal planes disposed at angles of 15° 5' with respect to the longitudinal axis of the handle as indicated by the arrows in Figure 4, and hence the straight edges 15 and 15a are also disposed at said angles; the 15° 5' angles of the two blade edges being disposed in alignment with each other as shown in Figure 4. In other words the 15° 5' angles of blades extend rearwardly toward the same side of the handle 10. That arrangement permits the tool to be used not only on each side of the clamp C as shown by the full and broken lines in Figure 1 but also on opposite sides of the casing as hereinafter explained.

In using the tool for removing a tire casing from a drop-center rim, the clamp C is applied to the top of the casing T, as shown in Figures 1 and 2, and tightened to move the top portions of the beads over the drop-center of the rim, and the tool is then used first on one side of the casing successively on opposite sides of the clamp C and then on the opposite side of the casing successively on opposite sides of the clamp. As shown in full lines in Figure 1, the tool has its blade 14a inserted between the rim flange and the casing so that the edge 15a contacts with the portion of the rim on which the bead normally rests and with the handle 10 extending to the right. Due to the 15° 5' angle of the blade 14a the handle is spaced from the casing and may be readily grasped and swung toward the user to cause the blade to act as a lever to push the bead inwardly so that it may drop into the drop-center of the rim. The tool is first thus applied and operated adjacent to one side of the clamp C and is then shifted downwardly one or more times toward the horizontal center of the casing and similarly operated. As the blade 14a moves the bead inwardly the opposed blade 14 of the T-shaped head presses the side wall of the casing laterally or inwardly the adjacent portion of the bead into the drop-center of the rim. The tool is then inverted so that the blade 14 is similarly inserted between the rim and bead on the opposite side of clamp C with the handle 10 extending to the left as shown in dotted lines in Figure 1. The tool is then similarly operated along the casing until the bead on the left side of the clamp is pushed off of the bead supporting portion of the rim so that it may drop into the drop-center. The same operations are repeated on each side of clamp C on the other side of the casing using the proper blades so that when the tool is applied the handle 10 will extend laterally away from the casing to permit it to be readily grasped by the operator's hand. The upper half of each bead may thus be readily and easily moved inwardly over or into the drop-center, and the end 12 of the tool may then be used as shown in Figure 2 to remove the lower half of the casing from the rim.

The tool may be similarly used on rims which do not have a drop-center and in which the tire beads are pushed or slid sidewise off of the rim after the removal of a side ring or wall on the rim. When the tool is to be used on both kinds of rims that are very wide, the length of the blades 14, 14a may not be sufficient to push the beads laterally to the necessary extent. To take care of such situations there is supplied with the tool a plurality of different sized chock or extension blocks B one of which is shown in Figures 5, 6 and 7. These are rectangular pieces of steel which may be inserted between the casing and the outer end of one of the blades, as will be understood on reference to Figure 4, so that when the lever 10 is swung away from the tire, the inner end of the blade will thrust against the rim flange as the outer end of the blade thrusts against the block. The block B has one end formed with a depression B' in which the outer end of the blade 14 or 14a seats.

The depression has its low point adjacent to one of the flat sides of the block as seen in Figure 7. The other end of the block is beveled at B'' to provide an edge to engage the casing to prevent slipping. The length of the blocks may vary from 1 to 10 inches so that the tool may be used on rims of various widths.

What is claimed is:

A tire tool for removing a tire casing from a wheel rim comprising an elongated handle having at its front end a pair of hatchet-shaped blades projecting in diametrically opposite directions, said blade being of substantially triangular shape with their opposite faces converging to their outer edges which extend in the direction of the length of the handle, whereby when one of said blades is inserted between a casing bead and a flange on a wheel rim and the handle is swung laterally said one blade will move the bead laterally and the other blade will press the side wall of the casing laterally for the purpose set forth, the central longitudinal planes of said blades extending at an angle of approximately 15° to the longitudinal axis of the handle, said central planes of the two blades extending in rearward directions on the same side of the handle, and the edges of the two blades converging rearwardly at an angle of approximately 8° to the longitudinal axis of the handle.

JOSEPH F. NEVILLE.

REFERENCES CITED

The following references are of record in the file of this patent:

UNITED STATES PATENTS

| Number | Name | Date |
|---|---|---|
| 1,020,141 | Gordon | Mar. 12, 1912 |
| 1,444,226 | Wallace | Feb. 6, 1923 |